United States Patent
Taylor et al.

(10) Patent No.: US 9,599,243 B1
(45) Date of Patent: Mar. 21, 2017

(54) INLINE RELIEF VALVE WITH PARABOLIC PISTON FACE

(71) Applicant: Taylor Innovations, LLC, Oklahoma City, OK (US)

(72) Inventors: Julian S. Taylor, Oklahoma City, OK (US); Bryce A. Bell, Oklahoma City, OK (US)

(73) Assignee: Taylor Innovations, LLC, Oklahoma City, OK (US)

( * ) Notice: Subject to any disclaimer, the term of this patent is extended or adjusted under 35 U.S.C. 154(b) by 19 days.

(21) Appl. No.: 14/832,467

(22) Filed: Aug. 21, 2015

Related U.S. Application Data (60) Provisional application No. 62/040,238, filed on Aug. 21, 2014.

(51) Int. Cl.
| | |
|---|---|
| *F16K 17/14* | (2006.01) |
| *F16K 1/36* | (2006.01) |
| *F16K 17/02* | (2006.01) |
| *F16K 31/12* | (2006.01) |

(52) U.S. Cl.
CPC .............. *F16K 17/14* (2013.01); *F16K 1/36* (2013.01); *F16K 17/025* (2013.01); *F16K 31/12* (2013.01)

(58) Field of Classification Search
CPC ........ F16K 17/14; F16K 17/025; F16K 31/12; F16K 1/36
USPC ......... 137/68.11, 68.16, 68.17, 70, 535, 312, 137/15.18; 251/62, 73, 102, 366
See application file for complete search history.

(56) References Cited

U.S. PATENT DOCUMENTS

| | | | | |
|---|---|---|---|---|
| 2,725,211 A * | 11/1955 | Boteler | ................. | F16K 7/126 251/331 |
| 3,631,882 A * | 1/1972 | White, Jr. | ............... | F16K 7/126 137/312 |
| 4,724,857 A * | 2/1988 | Taylor | ................... | F16K 17/406 137/538 |
| 5,273,065 A * | 12/1993 | Taylor | ..................... | F16K 17/14 137/494 |
| 5,577,523 A * | 11/1996 | Taylor | ................... | F16K 17/406 137/15.18 |
| 5,577,524 A * | 11/1996 | Taylor | ..................... | F16K 17/40 137/68.11 |
| 5,727,586 A * | 3/1998 | Taylor | ................... | F16K 17/406 137/68.11 |
| 5,860,442 A * | 1/1999 | Taylor | ................... | F16K 17/406 137/115.18 |

(Continued)

*Primary Examiner* — Jessica Cahill
*Assistant Examiner* — Minh Le
(74) *Attorney, Agent, or Firm* — Hall Estill Attorneys at Law (57) ABSTRACT

A pressure relief valve having a housing with an inlet port, an outlet port and a curvilinearly extending housing interior sidewall that defines a flow passageway through the housing from the inlet port to the outlet port. A piston assembly that is moveable between a closed position to establish a fluid-tight seal between the inlet port and the outlet port, and an open position to permit fluidic flow of pressurized fluid from the inlet port to the outlet port. The piston assembly has a piston head having a parabolically shaped piston face and elliptical perimeter that, when the inlet piston assembly is moved to the open position, aligns with the housing interior sidewall to provide a continuous transition from a position immediately upstream of the piston to a position immediately downstream of the piston.

20 Claims, 6 Drawing Sheets

(56) References Cited

U.S. PATENT DOCUMENTS

| | | | | |
|---|---|---|---|---|
| 6,058,961 | A * | 5/2000 | Taylor | F16K 17/14 137/68.11 |
| 6,135,134 | A * | 10/2000 | Taylor | F16K 17/28 137/460 |
| 6,276,389 | B1 * | 8/2001 | Taylor | F16K 17/406 137/312 |
| 6,425,410 | B1 * | 7/2002 | Taylor | F16K 17/406 137/467 |
| 6,679,472 | B2 * | 1/2004 | Baugh | F16K 3/262 166/86.3 |
| 8,573,244 | B2 * | 11/2013 | Taylor | F16K 17/406 137/624.27 |
| 8,915,260 | B2 * | 12/2014 | Klein | F16K 15/06 137/15.19 |
| 2011/0297255 | A1 * | 12/2011 | Weingarten | F16K 17/0453 137/535 |
| 2013/0193363 | A1 * | 8/2013 | van Den Eijkel | F16K 27/00 251/366 |
| 2014/0264138 | A1 * | 9/2014 | Bell | B25B 13/50 251/364 |
| 2015/0122353 | A1 * | 5/2015 | Chiba | F16K 47/02 137/535 |

* cited by examiner

INLINE RELIEF VALVE WITH PARABOLIC PISTON FACE

RELATED APPLICATIONS

The present application makes a claim of domestic priority to U.S. Provisional Patent Application No. 62/040,238 filed Aug. 21, 2014, the contents of which are hereby incorporated by reference.

BACKGROUND

Pressurized fluid systems are often used to transport and direct a pressurized fluid through a piping network. A variety of valve configurations can be used to direct and condition the fluidic flow through the system, such as pressure relief valves, emergency shutdown valves, blowdown valves, flapper valves, ball valves, pressure reducing valves (chokes), back pressure valves, pressure regulating valves, etc.

Depending upon the operational environment, a valve may be required to meet certain regulatory and/or system specified requirements, such as maintaining less than a maximum amount of pressure loss through the valve during operation. For example, some pressure relief valve applications require no more than a three percent (3%) loss in pressure through the valve upon valve opening. These and other types of requirements can restrict the available types and constructions of valves that can be used in a given application.

There is accordingly a need for improved pressure relief valve designs that provide relatively low pressure loss and other design metrics while achieving reliable and accurate set point operation. It is to these and other improvements that various embodiments of the present disclosure are directed.

SUMMARY

Various embodiments of the present disclosure are generally directed to a pressure relief valve with low pressure loss characteristics.

In some embodiments, the valve has a housing with an inlet port, an outlet port and a curvilinearly extending housing interior sidewall that defines a flow passageway through the housing from the inlet port to the outlet port. A piston assembly is moveable between a closed position to establish a fluid-tight seal between the inlet port and the outlet port, and an open position to permit fluidic flow of pressurized fluid from the inlet port to the outlet port. The piston assembly has a piston head having a parabolically shaped piston face and elliptical perimeter that, when the inlet piston assembly is moved to the open position, aligns with the housing interior sidewall to provide a continuous transition from a position immediately upstream of the piston to a position immediately downstream of the piston.

DETAILED DESCRIPTION

Without limitation, various embodiments of the present disclosure are generally directed to a pressure relief valve having a valve piston that moves within a valve housing between a closed position to an open position. The piston has a specially configured parabolic piston face that, when moved to the open position, aligns with an interior curvilinearly extending sidewall of the housing to provide a continuous cross-sectional area through the valve. This reduces pressure losses in pressurized fluid flowing through the valve.

Figure 1:
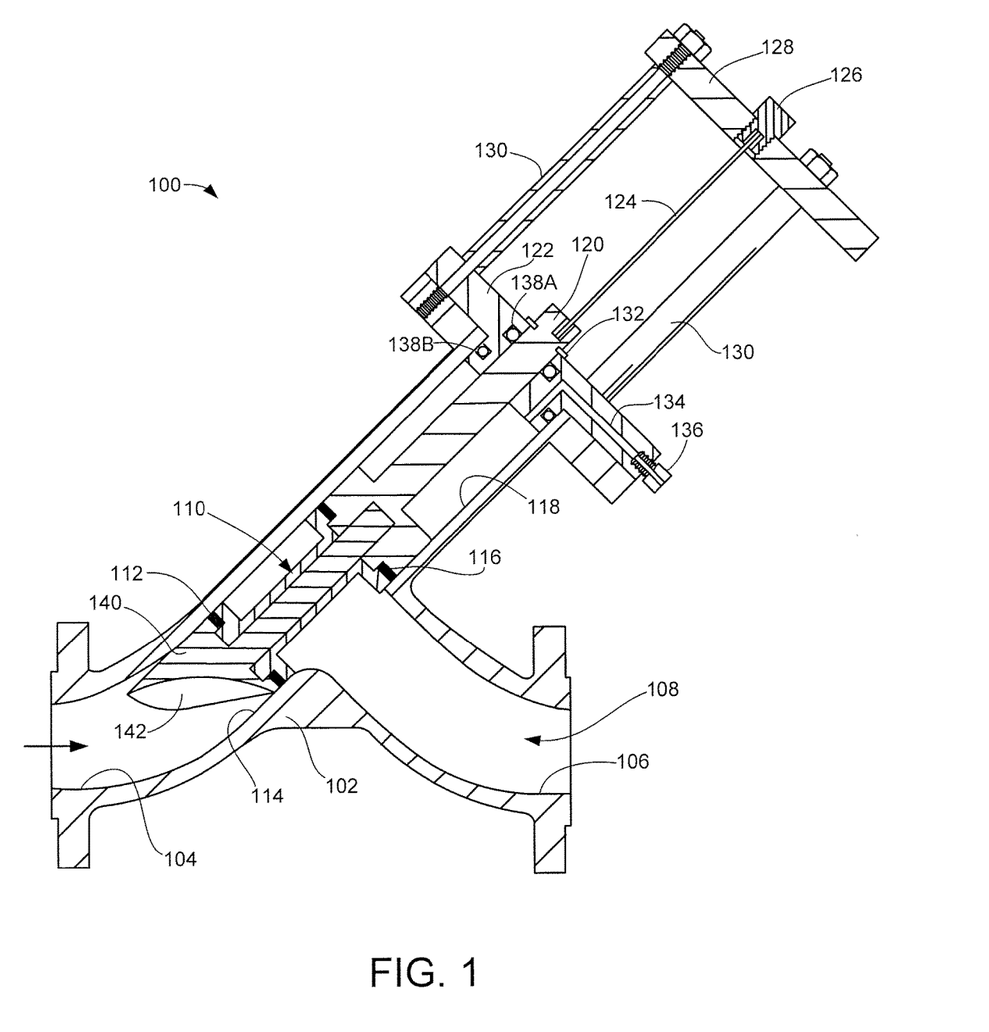
FIG. 1 is an elevational, cross-sectional representation of a normally closed (NC) in-line pressure relief valve constructed and operated in accordance with various embodiments of the present invention.

FIG. 1 is an elevational, cross-sectional view of a normally closed (NC) in-line pressure relief valve 100 constructed and operated in accordance with some embodiments. The valve 100 includes a rigid housing 102 with an inlet port 104 and an outlet port 106. A continuous curvilinearly extending interior passageway 108 extends from the inlet port 104 to the outlet port 106. The valve 100 is characterized as an in-line valve in that the respective inlet and outlet ports 104, 106 are axially aligned. Such is merely exemplary and is not limiting, in that other valve configurations, including right angle valves, can be formed and operated in accordance with the present disclosure.

Figure 2:
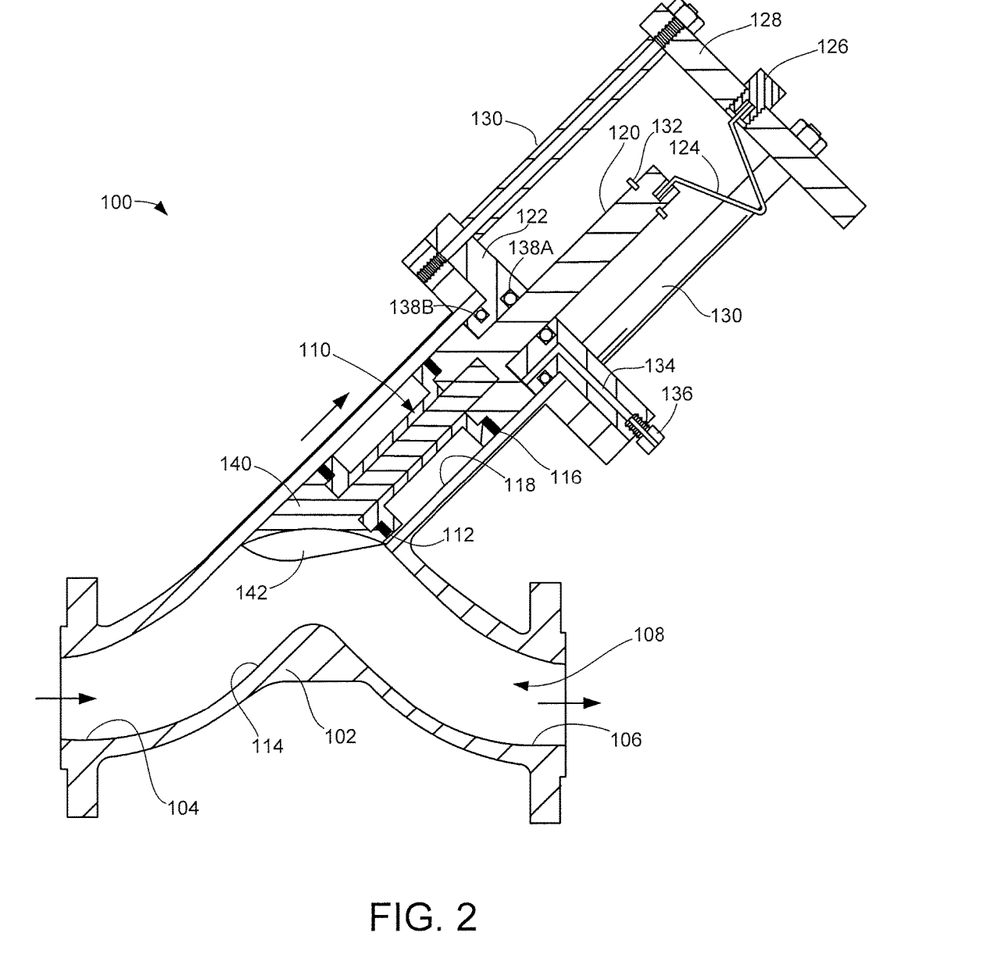
FIG. 2 shows the valve of FIG. 1 transitioned to an open position.

A piston assembly 110 is configured for reciprocal axial movement within the housing 102 between a closed position, as illustrated in FIG. 1, and an open position, as illustrated in FIG. 2. The piston assembly 110 includes a first annular sealing member 112 that contactingly engages an interior sidewall 114 of the passageway 108 to provide a fluid-tight seal in the closed position of FIG. 1. The first sealing member 112 may take the form of an elastomeric sealing ring, such as a rectangular or circular o-ring. A second annular sealing member 116, which may also take the form of an elastomeric seal, contactingly slides along interior sidewall 118 during axial movement of the piston assembly 110 to similarly form a fluid-tight seal.

A piston stem 120 extends upwardly through a bonnet plate 122 affixed to an upper end of the housing 102. The piston stem 120 supports a first end of a mechanically collapsible pin 124. A second end of the collapsible pin 124 is supported by a threaded fastener 126 that extends through a top plate 128. A series of spaced apart standoffs 130 are used to support the top plate 128 in fixed relation to the bonnet plate 122.

The pin 124 provides a retention force to maintain the piston assembly 110 in the normally closed position of FIG. 1. This force is opposed by the force supplied by the pressure of the inlet fluid at the inlet port 104. When the pressure of the inlet fluid reaches a predetermined set point pressure, the pin 124 buckles (collapses) and the piston assembly 110 moves to the open position of FIG. 2. This establishes internal fluidic flow along passageway 108 from inlet port 104 to outlet port 106.

To reset the valve to the normally closed position, the pressure at the inlet port 104 is temporarily removed (such as through the use of an upstream valve), a user removes the fastener 126, removes the bent pin (FIG. 2), pushes the piston stem 120 downwardly to the reset (closed position), places a new replacement pin into the piston stem, and reinstalls the fastener 126. The piston stem 120 supports a snap ring 132 or other limit member that contactingly engages an uppermost surface of the bonnet plate 122 to limit the maximum plunge depth of the piston assembly 110 in the closed position.

The bonnet plate 122 has an interior passageway 134 and threaded relief port 136 to permit ingress and egress of atmospheric air between the piston assembly 110 and the bonnet plate 122. Seals 138A and 138B, which may be in the form of elastomeric o-rings, provide fluid-tight seals between the bonnet plate 122 and the piston stem 120, and between the bonnet plate 122 and the housing 102.

The piston assembly 110 further includes a piston head 140 opposite the piston stem 120. The piston head 140 has a specially configured, parabolic piston face 142 that receives the inlet pressure of the fluid at the inlet port 104. When the piston assembly 110 is transitioned to the fully open position, the parabolic shape of the piston face 142 aligns with the interior surface 114 of the interior passageway 108 to provide a continuous flow surface for the pressurized fluid. The simplified illustrations of the piston face 142 in FIGS. 1 and 2 may not necessarily correspond to the actual elevational profile of the piston assembly from the vantage point represented in these figures, but these serve to initially convey general aspects of the present disclosure which will be addressed in detail below.

Figures 3, 4:
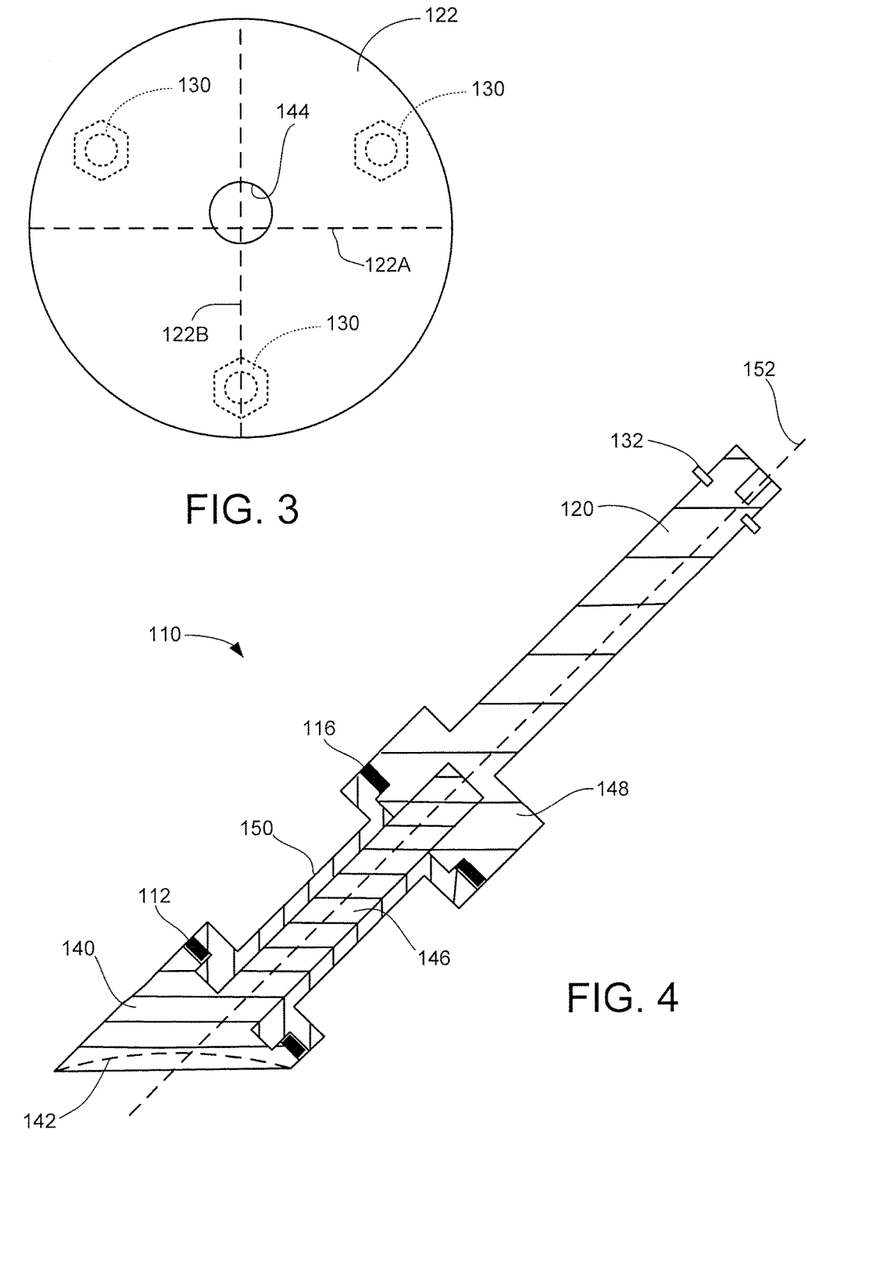
FIG. 3 shows a bonnet plate of the valve of FIGS. 1 and 2 in accordance with some embodiments.
FIG. 4 shows a piston assembly of the valve of FIGS. 1 and 2 having a parabolically shaped piston face in accordance with some embodiments.

Because of the parabolic shape of the piston face 142, the piston assembly 110 is keyed to a specific rotational orientation within the housing 102. To this end, FIG. 3 provides a top plan view of the bonnet plate 122. The placement of the three standoffs 130 are shown in broken line fashion for reference. An aperture 144 accommodates sliding movement of the piston stem 120 as shown above in FIGS. 1-2. The aperture 144 is offset with respect to the center of the bonnet plate 122, as noted by cross-reference lines 122A and 122B, thereby maintaining the desired rotational orientation of the piston assembly 110 in both closed and open positions. The actual position of the aperture 144 will depend on the particular configuration of the valve assembly.

During manufacturing, the piston assembly 110 can be inserted into the housing 102 and the bonnet plate 120 can be lowered so that the piston stem passes through the aperture 144. The bonnet plate is thereafter secured to the housing using the standoffs 130 or other fasteners. The snap ring 132 is inserted onto the stem 120 to retain the stem within the aperture 144. While the standoffs are shown to be nominally equally spaced (e.g., 120 degrees from each other), a non-uniform spacing can be provided for the standoffs or other fastener mechanisms to ensure the aperture 144 and the piston assembly 110 are correctly aligned with the housing 102.

It is contemplated that the keyed nature of the piston assembly 110 will not introduce additional levels of sliding friction to the system over and above that experienced by traditional circular pistons that can operate irrespective of rotational orientation. Nevertheless, special low friction coatings and sealing materials can be introduced as required to address any particular friction requirements of a given application.

FIG. 4 shows the piston assembly 110 separated from the housing 102 to illustrate various elements of interest. A central shaft 146 extends from the piston head 140. The central shaft 146 couples, such as via threads or another mechanical arrangement, to a stem body 148. A locking mechanism (not separately shown) such as a locking pin may be used to ensure the rotational position of the piston head 140 remains fixed to the rotational position of the stem body 148. An intermediate collar member 150 surrounds the shaft 146 and secures the respective sealing members 112, 116 in place.

A piston axis 152 denotes the center of travel of the piston assembly 110. The piston head 140, central shaft 146, collar member 150 and seals 112, 116 are nominally centered with respect to the axis 152, and the piston stem 120 is offset with respect to the axis 152. It will be appreciated that the arrangement of FIG. 4 is merely exemplary and that any number of piston assembly configurations can be used in accordance with the principles of the present disclosure.

Figure 5A:
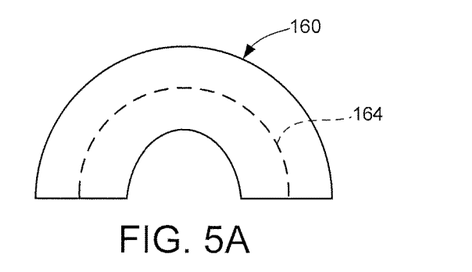
FIGS. 5A-5C provide respective schematic views of a toroidal element of the system to illustrate aspects of the piston face of FIG. 4.
Figure 5B:
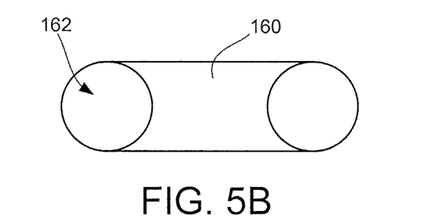

Aspects of the parabolic piston face 142 of the piston assembly 110 will now be discussed. To this end, a simplified example is provided beginning in FIGS. 5A-5C which illustrates a hollow, hemispheric toroidal member 160. The member 160 generally represents the boundaries of a desired internal passageway of a valve that will use a parabolic piston face such as provided on the piston assembly 110. FIG. 5A provides a side elevational view of the member 160, and FIG. 5B shows an end view of the member 160.

The example toroidal shape of the member 160 is provided merely for purposes of illustration. It is contemplated, albeit not necessarily required, that the member 160 has a circular cross-sectional area, as depicted at 162 in FIG. 5B. This circular cross-sectional area 162 is translated along a curvilinear path as denoted along 164 in FIG. 5A. The translational path 164 can be a circular path, a parabolic path, an elliptical path, a bell shaped curve (Gaussian) path, a segmented path, etc.

Figure 5C:
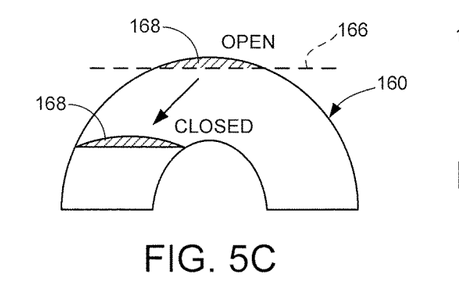

FIG. 5C shows a section line 166 that represents a "cut" that is applied across the top of the member 160. This defines an upper section 168, which is denoted in cross-hatch fashion. Those skilled in the art will recognize that the interior surface of the upper section 168 above line 166 will be generally parabolic along multiple axes, and the outermost perimeter of the upper section 168 will be generally elliptical in shape. While the section line 166 is substantially horizontal, such is not limiting as the sectioning of the surface of member 160 can be along any suitable orientation.

From a conceptual standpoint, a piston can thereafter be configured to have a piston face that substantially corresponds to the interior shape of the upper section 168. In the closed position, the parabolic piston face is positioned to occupy the location above section line 166 to provide a continuous interior passageway that corresponds to the interior shape of the member 160. The piston face can further be translated to a position where the piston face sealingly spans the circular cross section 162 in order to provide a closed position for the valve, as represented in FIG. 5C.

Figure 6:
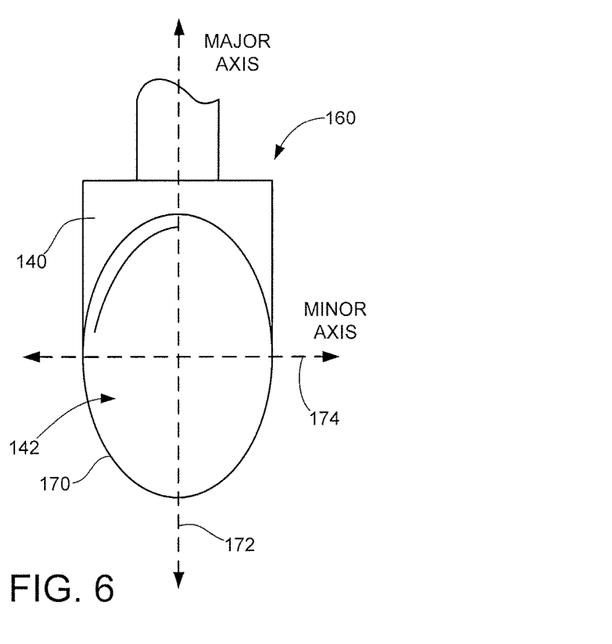
FIG. 6 is a bottom plan representation of the piston face.

FIG. 6 provides a bottom plan view representation of the piston assembly 110. The piston face 142 has an outer perimeter 170 that is substantially elliptical in shape. A major axis 172 bisects the perimeter 170 along the elliptic long axis, which is parallel to the direction of fluidic flow through the valve assembly 100. A minor axis 174 bisects the perimeter 170 along the elliptic short axis, which is orthogonal to the direction of fluidic flow through the valve assembly 100.

Figure 7A:
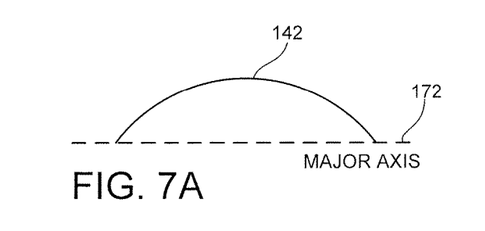
FIGS. 7A and 7B represent maximum depth views of the piston face along respective major and minor axes.
Figure 7B:
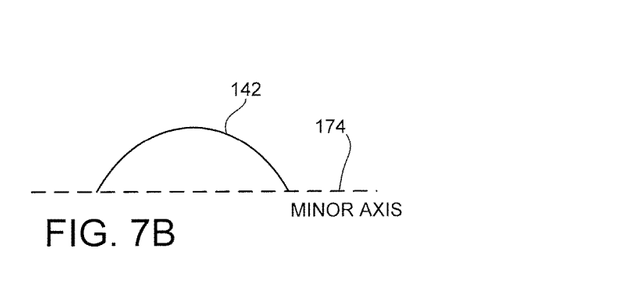

FIG. 7A is a side view representation of the parabolic shape of the piston face 142 along the major axis 172, and FIG. 7B is a side view representation of the parabolic shape of the piston face 142 along the minor axis 174. Similar parabolic shapes will extend across the piston face 142 along angled lines that intersect the major and minor axes 172, 174.

As noted above, the features set forth in FIGS. 6 and 7A-7B are merely exemplary and are not limiting, as the actual shape of the piston face will depend on a number of factors, including angle, depth, cross-sectional area and shape of the interior passageway, etc. Nevertheless, it will be understood from the foregoing discussion that the parabolic shape of the piston face allows the face to continuously align with the existing interior passageway when transitioned to the open position.

Figure 8:
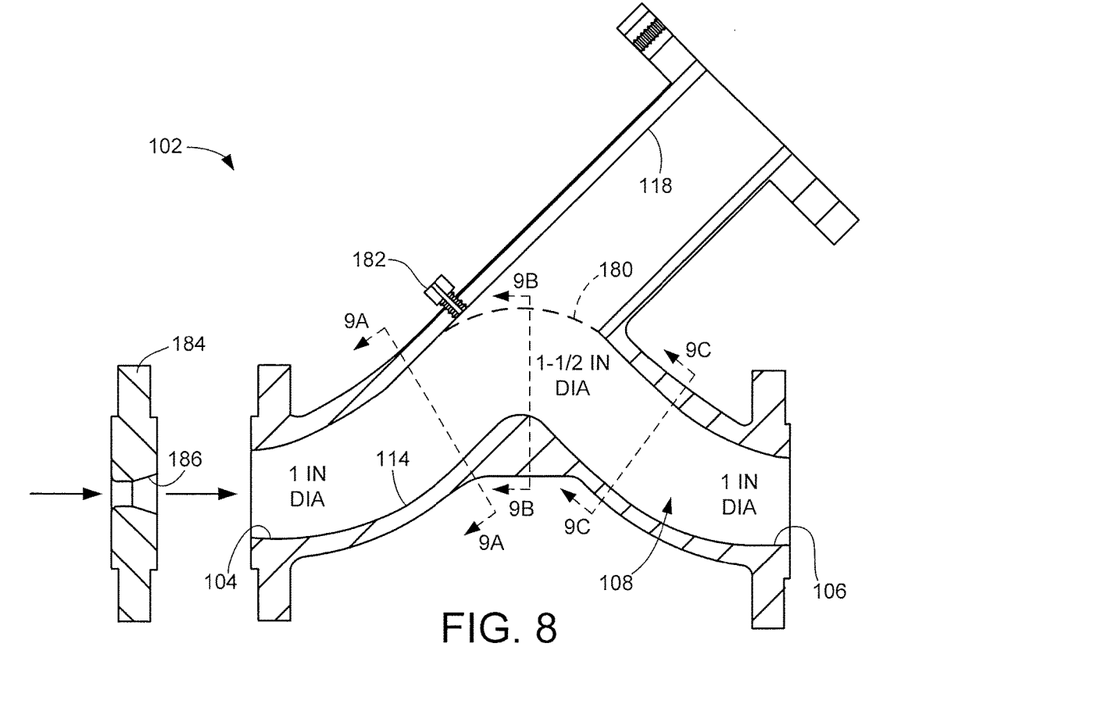
FIG. 8 is an elevational, cross-sectional representation of a housing of the valve of FIGS. 1 and 2 in accordance with some embodiments.

FIG. 8 is a cross-sectional view of the housing 102 of the valve assembly 100 without the piston assembly 110 to illustrate further elements of interest. The long axis medial path of the piston is denoted by broken line 180.

Figure 9A:
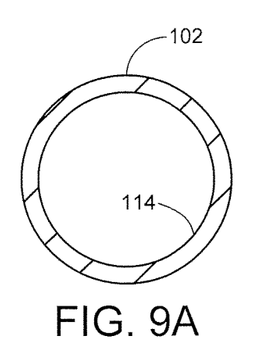
FIGS. 9A, 9B and 9C are different cross-sections from FIG. 8 to demonstrate the use of a nominally constant cross-sectional area through the embodiment of FIG. 8.
Figure 9B:
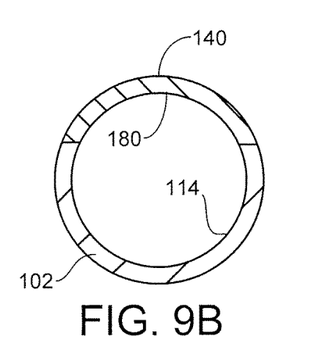
Figure 9C:
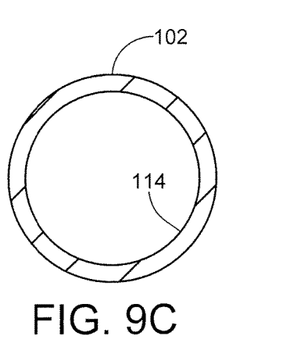

The interior passageway 108 is thus defined by the interior sidewall 114 and the piston surface (e.g., broken line 180). The interior passageway 108 generally takes a Gaussian shape. The inlet and outlet ports have a nominal innermost diameter of 1 inch. This expands gradually to about 1½ inch in the vicinity of the piston. This is demonstrated by the simplified cross-sections provided in FIGS. 9A, 9B and 9C, which respectively correspond to the views along lines 9A-9A, 9B-9B and 9C-9C in FIG. 8. Each of these cross-sections is nominally the same. Slightly increasing the cross-sectional area has been found to reduce pressure loss through the valve.

This constant cross-section is identified as a constant interior diameter of 1½ inches, but such is merely exemplary and is not limiting as any suitable dimensions can be provided. Similarly, other cross-sectional shapes can be provided through the valve apart from the circular cross-sections depicted in FIGS. 9A-9C. In other embodiments, a constant cross-sectional area, such as 1 inch or some other diameter value, can be maintained throughout the valve body.

FIG. 8 further shows a threaded relief port 182 that can be provided through the housing downstream of the piston closed position for condensation relief and pressure equalization. As required, an inlet orifice plate 184 can be positioned upstream of the inlet port 104 to provide required throttling of the inlet pressurized fluid. The orifice plate 184 includes an orifice 186 through which the fluid is directed.

Figure 10:
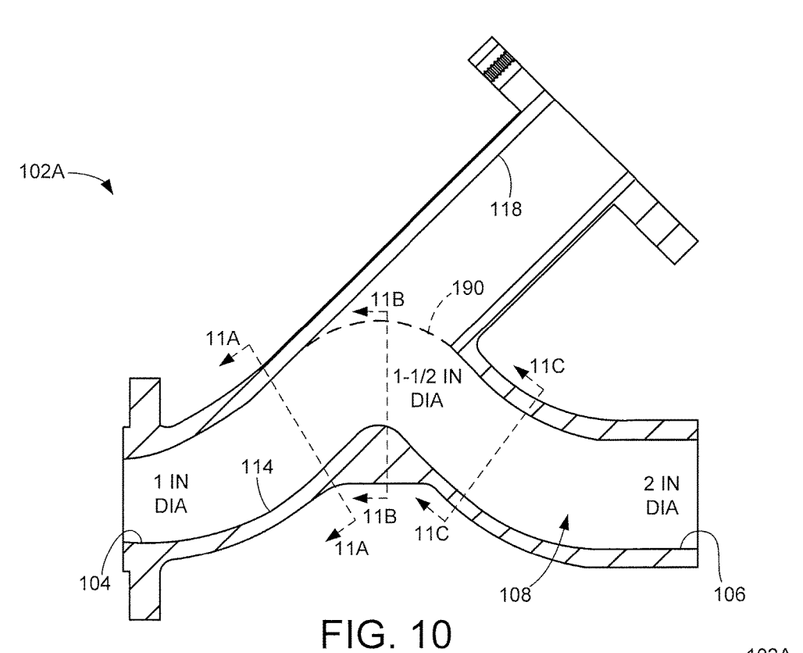
FIG. 10 is an elevational, cross-sectional representation of another housing of the valve of FIGS. 1 and 2 in accordance with other embodiments.

FIG. 10 shows another housing 102A of the pressure relief valve 100 in accordance with further embodiments. The housing 102A is generally similar to the housing 102 discussed above, and like reference numerals are provided for similar components. A corresponding piston assembly is utilized within the housing, and dotted line 190 represents the major axis parabolic shape of the piston face of the piston assembly in the open position.

Figure 11A:
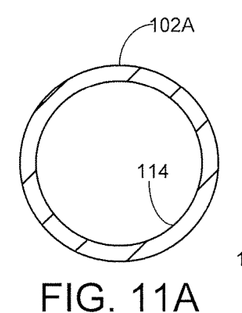
FIGS. 11A, 11B and 11C are different cross-sections from FIG. 10 to demonstrate the use of continuously increasing cross-sectional areas through the embodiment of FIG. 8.
Figure 11B:
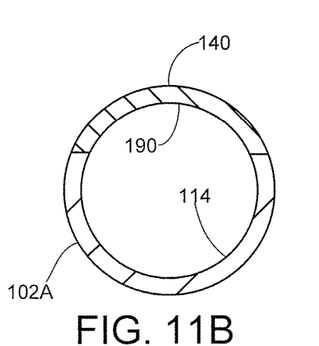
Figure 11C:
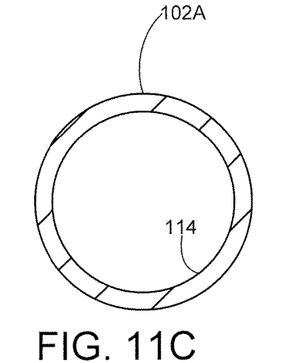

As before, the housing 120A provides an interior passageway 108 that generally follows a Gaussian shape. However, in FIG. 10 the cross-sectional area of the passageway gradually increases from the inlet port 104 to the outlet port 106. The example embodiment uses a diameter of nominally 1 inch at the inlet, nominally 2 at the outlet, and nominally about 1½ in the vicinity of the piston assembly. This is depicted by cross-sectional representations in FIGS. 11A, 11B and 11C. As before, FIG. 11A shows the generalized area of the passageway along view 11A-11A, FIG. 11B corresponds to view 11B-11B and FIG. 11C corresponds to view 11C-11C in FIG. 10.

The embodiment of FIG. 8 is suitable for use in applications where the valve assembly 100 operates to protect/activate a downstream pressure relief valve (not shown) such as a spring biased main valve. The valve assembly 100 provides a number of advantages over conventional arrangements such as those that employ a rupture disk upstream of such a pressure relief valve. The embodiment of FIG. 10 is suitable for use with the valve assembly 100 operating as a main bypass valve that vents to the atmosphere (or some other arrangement such as to a vessel). It will be appreciated that the various embodiments can be utilized in a wide variety of applications. For example, the valve may be configured as a flow control valve so that an actuator mechanism adjustably raises or lowers the piston head into various intermediate locations along the flow path. These and other alternatives will readily occur to the skilled artisan in view of the present disclosure.

It will now be appreciated that the various embodiments presented herein can provide a number of benefits over the art. The use of a piston face with a parabolic shape can provide enhanced flow efficiencies as the valve is transitioned to the open position. While the use of a buckling pin has been provided in various embodiments, such is merely exemplary and not limiting in that other valve actuation mechanisms, including springs, etc. can be utilized. Without limitation, various embodiments of the present disclosure can be characterized as including the following claims.

What is claimed is:

1. A pressure relief valve comprising:
   a housing having an inlet port, an outlet port and a curvilinearly extending interior sidewall to define a flow passageway through the housing from the inlet port to the outlet port; and
   a piston assembly moveable between a closed position to establish a fluid-tight seal between the inlet port and the outlet port along the flow passageway and an open position to permit fluidic flow of pressurized fluid from the inlet port to the outlet port along the fluid passageway, the piston assembly comprising a piston head having a parabolically shaped piston face and an elliptical perimeter that, when moved to the open position, aligns with the housing interior sidewall to provide a continuous transition from a position immediately upstream of the piston to a position immediately downstream of the piston.

2. The valve of claim 1, wherein the flow passageway in the vicinity of the piston assembly has a constant cross sectional area normal to a direction of the fluidic flow from the inlet port to the outlet port and the piston face cooperates with a portion of the interior sidewall to provide said constant cross sectional area.

3. The valve of claim 1, wherein the flow passageway in the vicinity of the piston assembly has a continuously increasing cross sectional area normal to a direction of the fluidic flow from the inlet port to the outlet port and the piston face cooperates with a portion of the interior sidewall to provide said continuously increasing cross sectional area.

4. The valve of claim 1, wherein the flow passageway has a centerline that passes from the inlet port to the outlet port, the centerline having a substantially Gaussian shape.

5. An inline relief valve comprising:
   a housing having an inlet port, an outlet port and a housing having an interior sidewall defining a curvalearly extending passageway between the inlet port and the outlet port;
   a piston assembly moveable by pressurized fluid between a closed position to establish a fluid-tight fluid seal along the flow passageway and an open position to permit fluidic flow from the outlet port, the piston assembly comprising a piston head having a parabolically shaped piston face and an elliptical shaped perimeter so that, when moved to the open position, the piston face aligns with the housing interior sidewall to provide a continuous transition from a position immediately upstream of the piston to a position immediately downstream of the piston; and
   wherein the flow passageway in the vicinity of the piston assembly has a cross sectional area normal to a direction of the fluidic flow from the inlet port to the outlet port and the piston face cooperates with a portion of the interior sidewall to provide said cross sectional area.

6. The inline relief valve of claim 5, wherein the cross sectional area of the flow passageway has a constant cross sectional area throughout the length of the flow passageway.

7. The inline relief valve of claim 5, wherein the cross sectional area of the flow passageway has a continuously increasing cross sectional area throughout the length of the flow passageway.

8. The inline relief valve of claim 5, wherein the flow passageway has a centerline that passes from the inlet port to the outlet port, the centerline having a substantially Gaussian shape.

9. The inline relief valve of claim 5 wherein the piston assembly further comprises a central shaft extending from the piston head, a piston stem extending from the piston shaft, a bonnet plate connected to the upper portion of the housing with an aperture therein, and the piston stem extending through the aperture.

10. The inlet relief valve of claim 9 further comprising a plurality of standoffs connected to and extending from the bonnet plate, a top plate supported by the standoffs, a collapsible pin the lower end of which is supported by the piston stem and the upper end of the collapsible pin supported by the top plate, the collapsible pin bent by the fluid pressure pressing against the piston head.

11. The inlet relief valve of claim 10, wherein the top plate has an aperture into which the upper end of the collapsible pin extends, the valve further comprising a threaded fastener that connects to the upper end of the collapsible pin to secure the upper end in the aperture, and whereby the collapsible pin is releasable once collapsed by the fluid flow pressing the piston assembly upward and a new pin insertable therein once the piston assembly has been returned to its closed position.

12. The inlet relief valve of claim 11, wherein the axis of the piston stem is offset to the axis of the central shaft, the bonnet plate aperture is offset from the center of the bonnet plate so that the parabolic piston face is maintained in proper orientation to the interior housing wall as the piston face as the valve is opened by fluid pressure against the piston face.

13. The inlet relief valve of claim 12, wherein the bonnet plate has an interior passageway communicating with the atmosphere and the interior of the house between the piston stem and the bonnet plate, a relief port connected to the passageway.

14. The inlet relief valve of claim 13, further comprising an inlet orifice plate connected at the inlet port and having an orifice hole by which pressurized fluid is admitted to the flow passageway to throttle the pressurized fluid entry to the flow passageway as required.

15. An inline relief valve comprising:
   a housing having an inlet port, an outlet port and a housing having an interior sidewall defining a curvalearly extending passageway between the inlet port and the outlet port;
   a piston assembly moveable by pressurized fluid between a closed position to establish a fluid-tight fluid seal along the flow passageway and an open position to permit fluidic flow from the outlet port, the piston assembly comprising a piston head having a parabolically shaped piston face and an elliptical shaped perimeter so that, when moved to the open position, the piston face aligns with the housing interior sidewall to provide a continuous transition from a position immediately upstream of the piston to a position immediately downstream of the piston;
   wherein the flow passageway in the vicinity of the piston assembly has a cross sectional area normal to a direction of the fluidic flow from the inlet port to the outlet port and the piston face cooperates with a portion of the interior sidewall to provide said cross sectional area;
   wherein the cross sectional area of the flow passageway has a constant cross sectional area throughout the length of the flow passageway; and
   wherein the flow passageway has a centerline that passes from the inlet port to the outlet port, the centerline having a substantially Gaussian shape.

16. The inline relief valve of claim 15, wherein the piston assembly further comprises a central shaft extending from the piston head, a piston stem extending from the piston shaft, a bonnet plate connected to the upper portion of the housing with an aperture therein, and the piston stem extending through the aperture.

17. The inlet relief valve of claim 16, further comprising a plurality of standoffs connected to and extending from the bonnet plate, a top plate supported by the standoffs, a collapsible pin the lower end of which is supported by the piston stem and the upper end of the collapsible pin supported by the top plate, the collapsible pin bent by the fluid pressure pressing against the piston head.

18. The inlet relief valve of claim 17, wherein the top plate has an aperture into which the upper end of the collapsible pin extends, the valve further comprising a threaded fastener that connects to the upper end of the collapsible pin to secure the upper end in the aperture, and whereby the collapsible pin is releasable once collapsed by the fluid flow pressing the piston assembly upward and a new pin insertable therein once the piston assembly has been returned to its closed position.

19. The inlet relief valve of claim 18, wherein the axis of the piston stem is offset to the axis of the central shaft, the bonnet plate aperture is offset from the center of the bonnet plate so that the parabolic piston face is maintained in proper orientation to the interior housing wall as the piston face as the valve is opened by fluid pressure against the piston face.

20. The inlet relief valve of claim 19, wherein the bonnet plate has an interior passageway communicating with the atmosphere and the interior of the house between the piston stem and the bonnet plate, a relief port connected to the passageway.

* * * * *